(No Model.)
H. CLAYTON.
HARVESTER TRUCK.
No. 288,208. Patented Nov. 13, 1883.
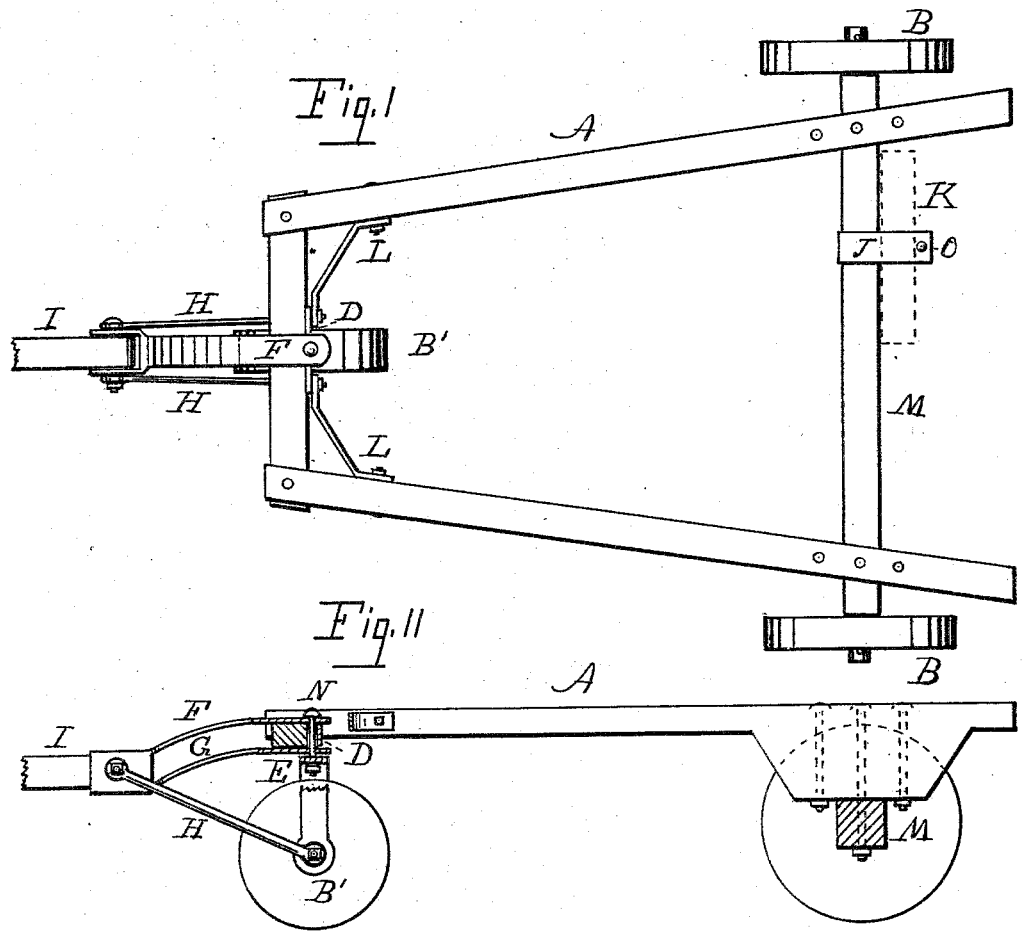
WITNESSES:
John Trautmann
Leopold Leebold
INVENTOR
Henry Clayton
BY B. Pickering
ATTORNEY

UNITED STATES PATENT OFFICE.

HENRY CLAYTON, OF DAYTON, OHIO.

HARVESTER-TRUCK.

SPECIFICATION forming part of Letters Patent No. 288,208, dated November 13, 1883.

Application filed August 31, 1883. (No model.)

*To all whom it may concern:*

Be it known that I, HENRY CLAYTON, a citizen of the United States, residing at Dayton, in the county of Montgomery and State of Ohio, have invented a certain new and useful Improvement in Harvester-Trucks; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in three-wheeled trucks for moving harvesters; and it consists of the manner of securing the front wheel to the frame and the device for holding the harvester on the frame.

The mechanism is illustrated in the accompanying drawings, in which Figure 1 is a top view of the truck. Fig. 2 is an irregular section of the same.

Like letters designate like parts throughout the several views.

The general features of the truck are like those in use.

A is the frame, the rear part of which is mounted on blocks to elevate the frame above the wheels B, and the front end bears on the bifurcated standard E, which is supported by the wheel B'.

To the cross-piece of the frame is bolted the cast plate D, with a central circular orifice for a "king" or coupling bolt, N. The inner ends of stays L are held by the same bolts holding the plate, and the outer ends are bolted directly to the sides of the frame. A large bolt is passed through the eyes of the stays H and the holes in the standard, which serves as the spindle for the front wheel.

F and G are two plates united at their forward ends to support the tongue I. The former has a bearing above the cross-piece of frame and the latter below the same. The tongue and side stays are held by the same bolt. The tongue and front wheel are thus securely pivoted to the frame.

At J is a stirrup which embraces the rear axle, M, the free ends of which pass over the rim of the driving-wheel of a harvester, and the pin O enters the ends of the same to secure the harvester in position on the frame, the dotted lines at K indicating the position of the harvester driving-wheel.

The harvester is loaded on the truck by raising the platform and pushing the truck beneath until the axle is brought to the driving-wheel, where the same is fastened by the stirrup.

Having fully described my invention, what I claim, and desire to secure by Letters Patent, is—

1. The plates F and G, with extension for the tongue, stays H, bifurcated standard E, and plate D, combined with frame A, substantially as set forth.

2. The stirrup J, with pin, in combination with the rear axle of a truck, to bind the wheel of a harvester to the frame, substantially as set forth.

In testimony that I claim the foregoing as my own I affix my signature in presence of two witnesses.

HENRY CLAYTON.

Witnesses:
B. PICKERING,
C. W. DUSTIN.